United States Patent [19]

McDowell, II

[11] Patent Number: 5,572,188

[45] Date of Patent: Nov. 5, 1996

[54] DISTRESS WARNING SIGNAL DEVICE

[76] Inventor: Robert A. McDowell, II, 1920 N. 48th Ave., Hollywood, Fla. 33021

[21] Appl. No.: 429,788

[22] Filed: Apr. 27, 1995

[51] Int. Cl.⁶ ..................................................... B60Q 7/00
[52] U.S. Cl. .......................... 340/473; 340/471; 340/470; 116/63 P; 116/63 T; 40/610; 40/612
[58] Field of Search ....................................... 340/473, 470, 340/471, 483, 487–90; 359/552, 553, 547, 532; 116/63 P, 63 T; 40/610, 612; D10/109

[56] References Cited

U.S. PATENT DOCUMENTS

| | | | |
|---|---|---|---|
| D. 193,597 | 9/1962 | Van De Velde | D10/109 |
| D. 196,158 | 8/1963 | Romano | D10/109 |
| D. 206,107 | 10/1966 | Sherrill | D10/109 |
| D. 362,199 | 9/1995 | Evans | D10/109 |
| 2,484,142 | 10/1949 | Arnold | 340/473 |
| 3,135,235 | 6/1964 | Romano | 116/63 T |
| 3,593,681 | 7/1971 | Sernovitz | 116/63 T |
| 3,625,177 | 12/1971 | Miller | 116/63 T |
| 4,080,924 | 3/1978 | Le Claire | D10/109 |
| 4,759,606 | 7/1988 | McDowell | 350/97 |
| 5,422,638 | 6/1995 | Singer et al. | 116/63 P |
| 5,438,782 | 8/1995 | Belobraydich et al. | 40/610 |

Primary Examiner—Brent A. Swarthout
Assistant Examiner—Ashok Mannava
Attorney, Agent, or Firm—Oltman Flynn & Kubler

[57] ABSTRACT

An erectable and collapsible warning signal reflector assembly includes a pair of crossed arms that are pivotally connected to one another at their crossing point and are further attached to a vertical post stand at the same point. An elongated hollow box is used as a stand. The bottom of the vertical post is positioned into an opening in a top lid cover of the elongated box stand. When the crossed arms and post are rotated along the same plane, the entire assembly can be fit into the elongated box for storage purposes. Electrically powered lights are located on at least one side of each of the arms. The lights can be powered by a battery and switch inside each of the arms. Alternatively, the lights can be powered by an adapter plug that can be inserted into a conventional cigarette lighter. Alternatively, the lights can be reflector covers.

14 Claims, 3 Drawing Sheets

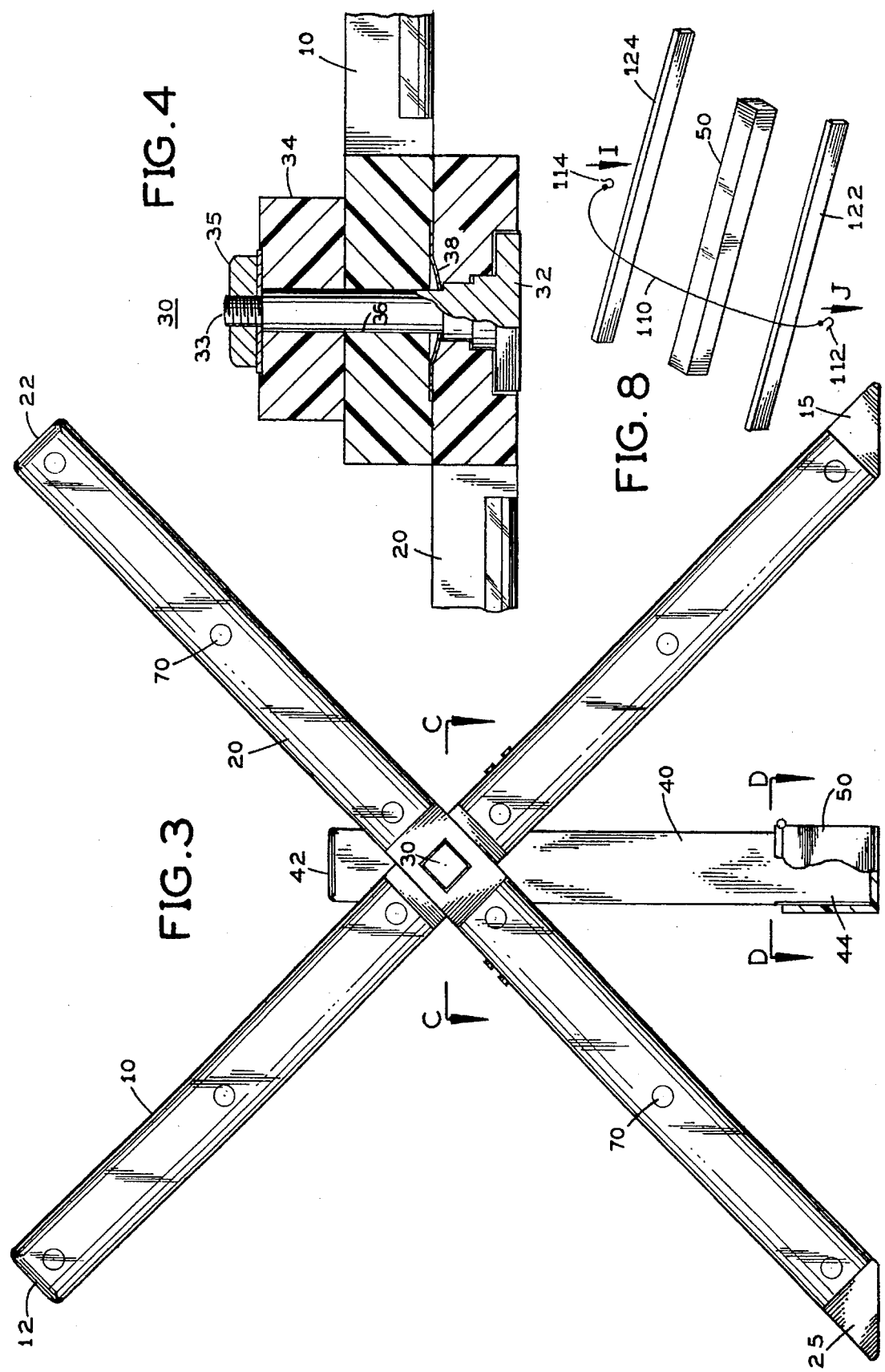

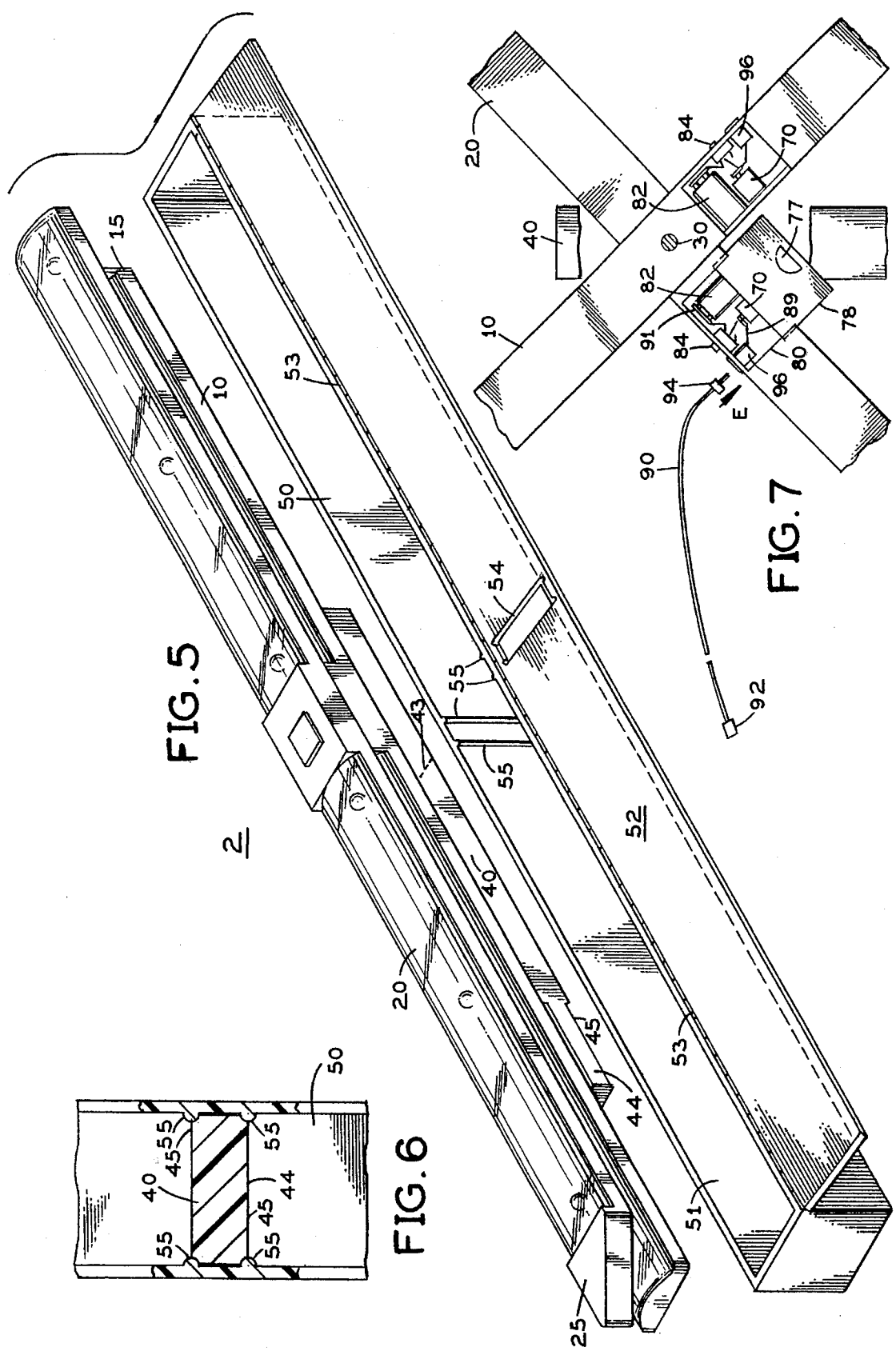

DISTRESS WARNING SIGNAL DEVICE

This invention relates to an erectable and collapsible warning signal light reflector assembly for use on and off roadways that uses a longitudinal stand that also stores the collapsed assembly, and is powered by either a battery or a vehicle's cigarette lighter.

BACKGROUND AND PRIOR ART

It has been advantageous for motorists to have some type of light source to warn other drivers of a vehicle breakdown. The need for a light assembly is greatly increased when vehicle breakdowns occur at night and/or during serious weather conditions such as fog, rain and snow storms. Automobiles are generally equipped with an internal flashing assembly that is part of the braking lights and turn signal lights. However, such lights are mostly located near ground level in the bumper portions of the vehicles which at such low heights can be poorly visible by other drivers. Furthermore, the visibility of these braking and turn-signal lights is even less effective when the disabled vehicle is perpendicular to a roadway, or on the other side of a hill or around a sharp curve.

Other warning devices have problems as well. Lighting torches can be dangerous and such devices are not reusable. A prior art reflector assembly has been made with collapsible arms. See U.S. Pat. No. 4,759,606 to McDowell. However, that reflector assembly does not use an artificial source of light but instead relies on light reflective materials. Furthermore the assembly in patent '606 is supported by only two foot portions which each have narrow lengths and narrow widths. Using only two foot supports tends to make the device unstable especially during wind and storm conditions. Still further, the assembly in patent '606 while collapsible is bulky to carry and difficult to store due to the bolt ends and wing nuts which protrude out from the collapsed assembly.

Thus, the need exists for a warning signal reflector assembly that avoids the problems of the prior art.

SUMMARY OF THE INVENTION

The first objective of the present invention is to provide a collapsible reflector assembly that is stable when erected.

The second object of this invention is to provide a collapsible reflector assembly that can be stored in a longitudinal box.

The third object of this invention is to provide a collapsible reflector assembly that can be erected using the storage box as a stand.

The fourth object of this invention is to provide a collapsible reflector assembly that has artificial battery powered lights.

The fifth object of this invention is to provide a collapsible reflector assembly that can use a plug that attaches to a cigarette lighter to power the reflector lights.

The sixth object of this invention is to provide a collapsible reflector assembly that is stable enough to be supported on the roof of an automobile.

Further objects and advantages of this invention will be apparent from the following detailed description of a presently preferred embodiment which is illustrated schematically in the accompanying drawings.

BRIEF DESCRIPTION OF THE FIGURES

FIG. 3 is a front view of the invention in FIG. 1 depicted along arrow A.

FIG. 4 is a cross sectional view of the invention of FIG. 3 along arrow C.

FIG. 5 is a perspective view of the invention in FIG. 1 in a collapsed state positioned for insertion into the box stand.

FIG. 6 is a cross sectional view of the invention of FIG. 3 along arrow D.

FIG. 7 is a sectional view of the invention in FIG. 3 showing the battery, switch and optional lighter plug adapter.

FIG. 8 is a partial view of fixably positioning the invention assembly 1 of FIG. 1, to a luggage rack on top of a vehicle.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
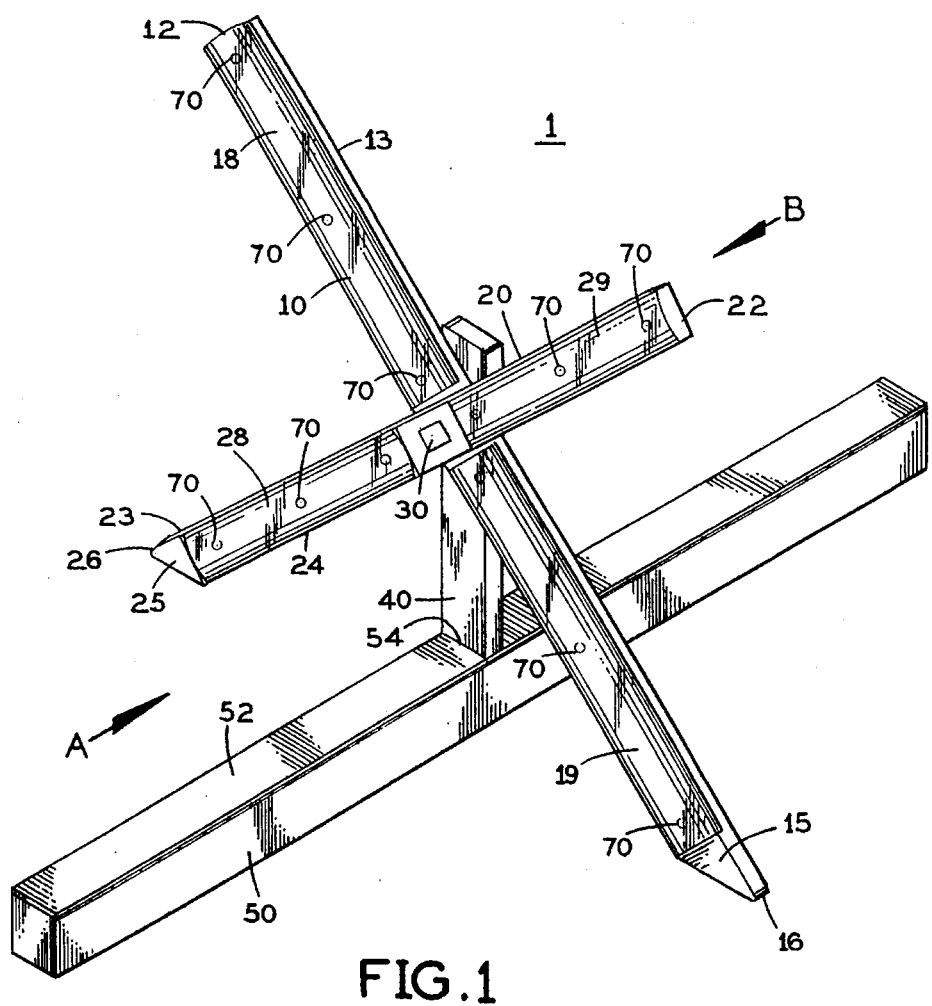
FIG. 1 is a perspective view of a preferred embodiment of the warning signal invention.
Figure 2:
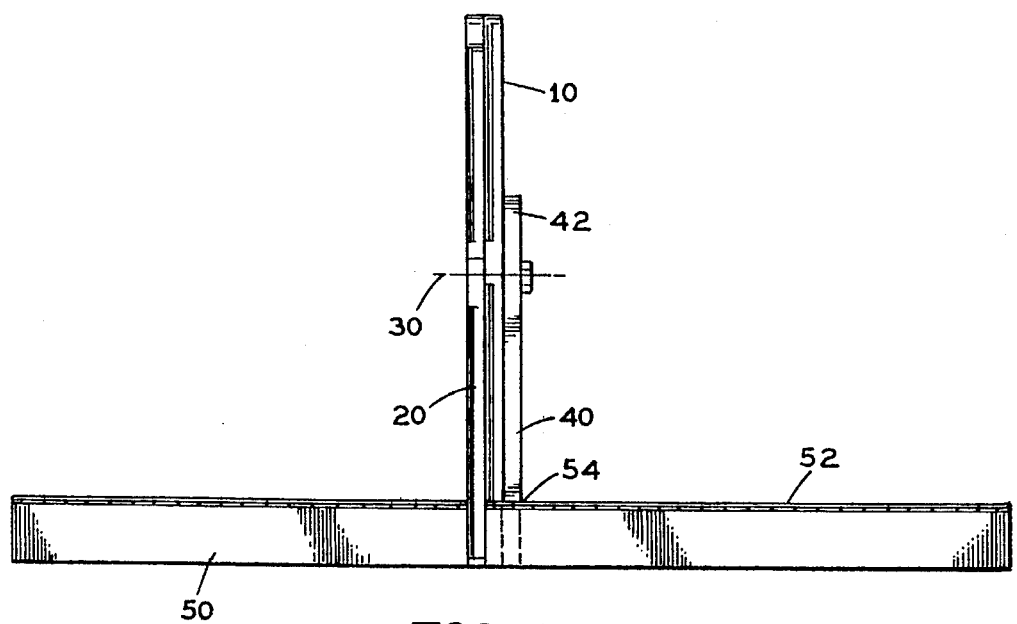
FIG. 2 is a side view of the invention in FIG. 1 depicted along arrow B.

The invention will be first described referring to FIGS. 1, 2 and 3. FIG. 1 is a perspective view of a preferred embodiment of the warning signal invention 1. FIG. 2 is a side view of the invention in FIG. 1 depicted along arrow B. FIG. 3 is a front view of the invention in FIG. 1 depicted along arrow A. Referring to FIGS. 1, 2, and 3, 10 has a top flat end 12 with upper side 13, lower side 14, and an angled end 15 which is used as a footer for positioning on the ground. A second elongated arm 20 has a top flat end 22 with upper side 23, lower side 24, and an angled end 25 which is used as a footer for positioning on the ground. Arm 10 has a left front cover plate 18 and a right front cover plate 19 that each have electrical light sources 70 positioned thereunder. Alternatively, sources 70 can be reflector covers such as those used by the inventor in U.S. Pat. No. 4,759,606 to McDowell cited in the Background And Prior Art section and incorporated by reference. Conventional wiring, not shown, is connected to a power supply which will be described later in reference to FIG. 7. Arm 20 also has a left front cover plate 28 and a right front cover plate 29 for covering electrical light sources 70 in the same manner as done in arm 10. Electrical light sources 70 can be colored bulbs or light emitting diodes that would be visible in extreme weather conditions such as during fog. Alternatively, strobe lights can be used as well for light sources 70. The arms 10, 20, post 40 and box 50 can be formed from various types of materials such as but not limited to wood, metal, aluminum, molded plastic, fiberglass, combinations thereof, and the like. The cover plates are transparent.

Referring to FIGS. 1–3 crossed arms 10, 20 arc locked into position at pivot point 30 using fasteners which will described in reference to FIG. 4. Referring to FIGS. 1–3, pivot point 30 also is connected to a vertical support post 40 having an upper end 42 and a lower end 44 the latter of which is inserted into a slot opening 54 of a lid 52 which covers the opening of an elongated box 50.

The pivot point connection 30 shown in FIGS. 1–3 will now be discussed in reference to FIG. 4. FIG. 4 is a cross sectional view of the invention of FIG. 3 along arrow C. Pivot point 30 includes a flat square headed bolt 32 which is inserted within a through-hole 36 that passes from arm 20 through arm 10 and is held in place by threading a nut 35 about threads 33 on the bolt 32. When the invention is assembled for positioning along a roadside, the arms 10 and 20 are put into their crossed position with footers 15 and 25 touching the ground. Nut 35 is rotated abutting against washer 34 and squeezing spring washer 38 in place. Optionally, a lock-washer can be substituted for the spring washer 38.

The base portion 44 of support post 40 when inserted into box 50 is best shown by FIG. 6. FIG. 6 is a cross sectional view of the invention of FIG. 3 along arrow D. Base portion 44 has a narrower diameter 45 than the portion of post 40 which protrudes above the lid 52 of the box. The narrower diameter 45 of post base 44 can be more clearly shown in FIG. 5. When ready for use the narrower base portion 44 of post 45 is inserted through slot/opening 54 of lid 52. Slot/opening 54 is approximately the same size as post base portion 44. Four internal ridges 55 which protrude vertically along the interior sides of box 50 (best seen in FIGS. 5 and 6) hold the base portion 44 in place and allow post 40 to be vertical during use.

To collapse the warning light assembly device, bolt 32 is loosened by rotating nut 35 counterclockwise. FIG. 5 is a perspective view of the invention in FIG. 1 in a collapsed state positioned for insertion into the box stand. Arms 10, 20 and post 40 are then pivotally rotated into an aligned parallel position with footers 25 and 15 of each respective arm on opposite ends as shown in FIG. 5. This aligned and parallel configuration 2 of the arms 10, 20 and post 40 are then inserted into the opening 51 of box 50. Lid 52 is connected by hinges 53 in order to allow the lid 52 to close the box 50 for storage. The box 50 with disassembled assembly 2 inside can be stored in the trunk of an automobile.

The power supply for the invention will be described in reference to FIG. 7 which is a sectional view of the invention along arrow G in FIG. 1 showing the battery, switch and optional lighter plug adapter. Referring to FIG. 7, a cover plate 78 slides into side slots 79 of an opening 80 in the back of arms 10 and 20. Inside opening 80 is the light bulb source 70 which is connected by wires to a battery power supply 82 such as a 12 volt battery and the like, and is turned on and off by externally activated switch 84 which can be a toggle switch and the like. Alternatively, an adapter 90 can be used which has a prong end 94 that can be inserted in the direction of arrow E into a socket 96. Switch 84 can be a three position switch with a middle position for off, a left side position for wire 89 for using the adapter 90, and a fight side position for wire connection 91 using the battery 82. The lights are attached to the cross arms. Solar power is also possible.

FIG. 8 is an exploded view of fixably positioning the invention assembly 1 of FIG. 1, to a luggage rack on top of a vehicle. Elastic "bungee" cord fasteners 110 having hooks 112 and 114 on opposite ends can be used to overly base stand 50 between rails 122 and 124 of a conventional luggage type rack. Here, hook 112 can be stretched in the direction of arrow J to wrap about luggage rack rail 122, while the other hook 114 can be stretched in the direction of arrow I to wrap about luggage rack rail 124 with base stand 50 in between. While FIG. 8 shows a stretch type cord, other types of fasteners such as but not limited to straps, ropes and the like, can also be used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An erectable and collapsible warning signal assembly for roadside use comprising:

a first elongated arm having a top end, a bottom end, and a midpoint section substantially halfway between the top end and the bottom end;

a second elongated arm having a top end, a bottom end, and a midpoint section substantially halfway between the top end and the bottom end, the midpoint section of the first arm being pivotally connected to the midpoint section of the second elongated arm at a pivot point;

a electrically powered light attached to at least one of the elongated arms;

a vertical support post having an upper portion and a lower portion, the upper portion attached to the first elongated arm and the second elongated arm at the pivot point;

an elongated hollow stand having an upper opening for receiving the lower portion of the vertical support post, wherein the axis of the stand is substantially perpendicular to the axis of the support post, and wherein the bottom end of the first elongated arm, the bottom end of the second elongated arm and the elongated hollow stand solely support the assembly.

2. The erectable and collapsible warning signal assembly of claim 1, further comprising:

a battery for powering the electrically powered light.

3. The erectable and collapsible warning signal assembly of claim 1, further comprising:

a lighter plug for supplying power to the electrically powered light.

4. The erectable and collapsible warning signal assembly of claim 1, the elongated hollow stand further including:

a lid having one side hingedly attached to one side of the stand.

5. The erectable and collapsible warning signal assembly of claim 1, further comprising:

an angled end on the bottom end of the first elongated arm; an angled end on the bottom end of the second elongated arm.

6. The erectable and collapsible warning signal assembly of claim 1, further comprising:

a strap for holding the assembly to a vehicle luggage rack.

7. The erectable and collapsible warning signal assembly of claim 1, wherein the pivot point includes:

a bolt and nut for holding the first elongated arm and the second elongated arm in a cross position.

8. The erectable and collapsible warning signal assembly of claim 7, wherein the pivot point includes:

a spring washer for abutting against an inner side of the nut.

9. The erectable and collapsible warning signal assembly of claim 7, wherein the pivot point includes:

a lock washer for abutting against an inner side of the nut.

10. The erectable and collapsible warning signal assembly of claim 1, wherein the elongated hollow stand includes:

a box; and a lid having the opening for receiving the post therethrough.

11. The erectable and collapsible warning signal assembly of claim 10, wherein the lid further includes:

hinges for rotatably holding the lid to the box.

12. The erectable and collapsible warning signal assembly of claim 1, wherein said light includes:

a transparent cover plate.

13. An erectable and collapsible signal assembly for roadside use comprising:

a first elongated arm having a bottom end, a midpoint and a top end;

a second elongated arm having a bottom end, a midpoint and a top end, the midpoint of the first arm being pivotally connected to the midpoint of the second elongated arm at a pivot point;

a reflector attached to at least one of the elongated arms;

a support post pivotally attached to the first elongated arm and the second elongated arm at the pivot point, the first elongated arm and the second elongated arm and the post being aligned together parallel to one another in an initial position, the first elongated arm crossed at a midsection to a midsection of the second elongated arm, with the support post extending substantially vertical therefrom in an assembled position;

an elongated hollow box stand having an upper opening for receiving the lower portion of the vertical support post, wherein in We assembled position the axis of the stand is substantially perpendicular to the axis of the support post and both the bottom ends of the first and second elongated arms and the hollow box stand support the assembly, and in a disassembled position, the hollow elongated box stand stores the first elongated arm, the second elongated arm and the vertical post.

14. The erectable and collapsible warning signal assembly of claim 13, wherein said light includes:

a transparent cover plate.

* * * * *